March 31, 1936.  E. I. McKESSON  2,035,492

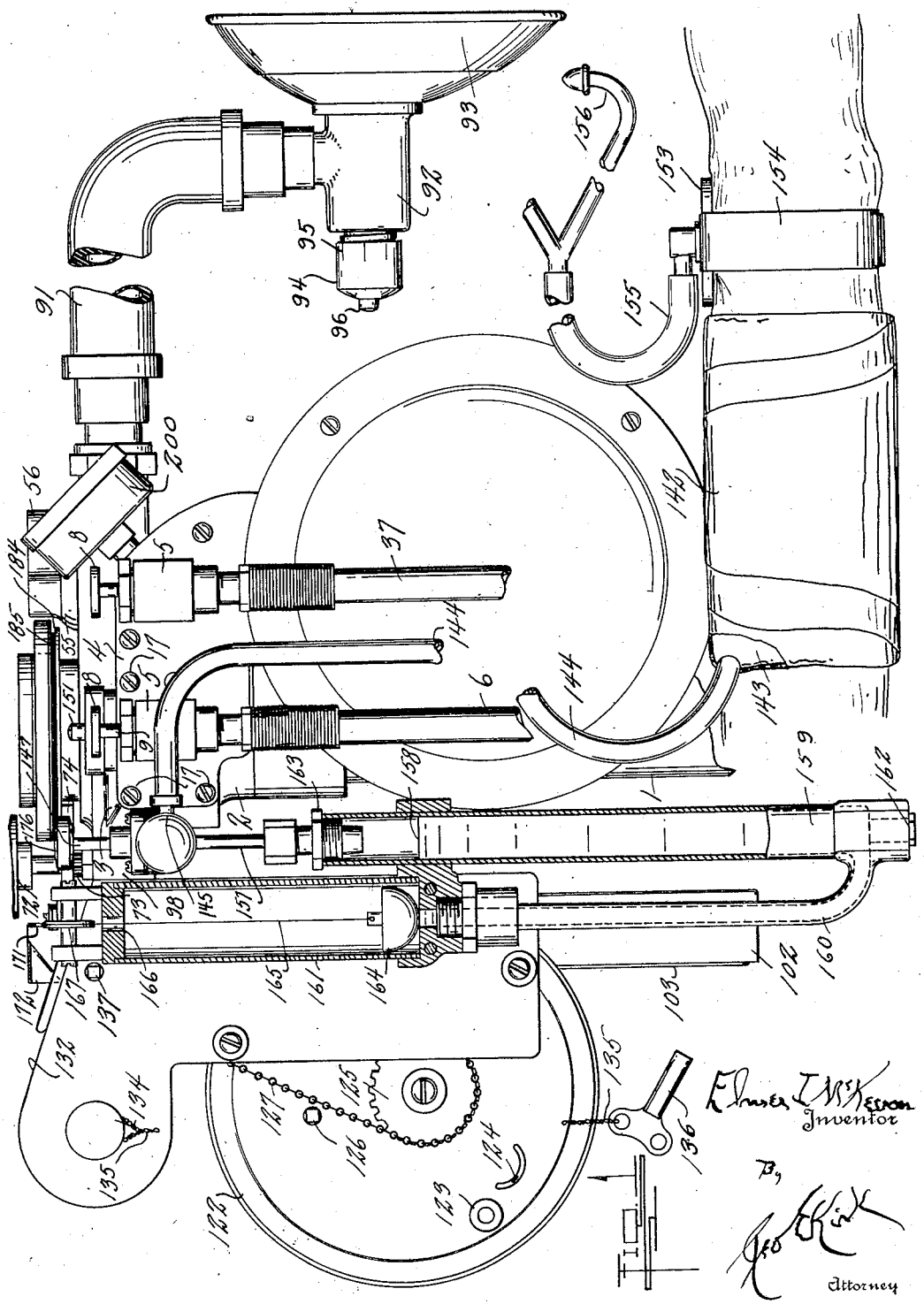

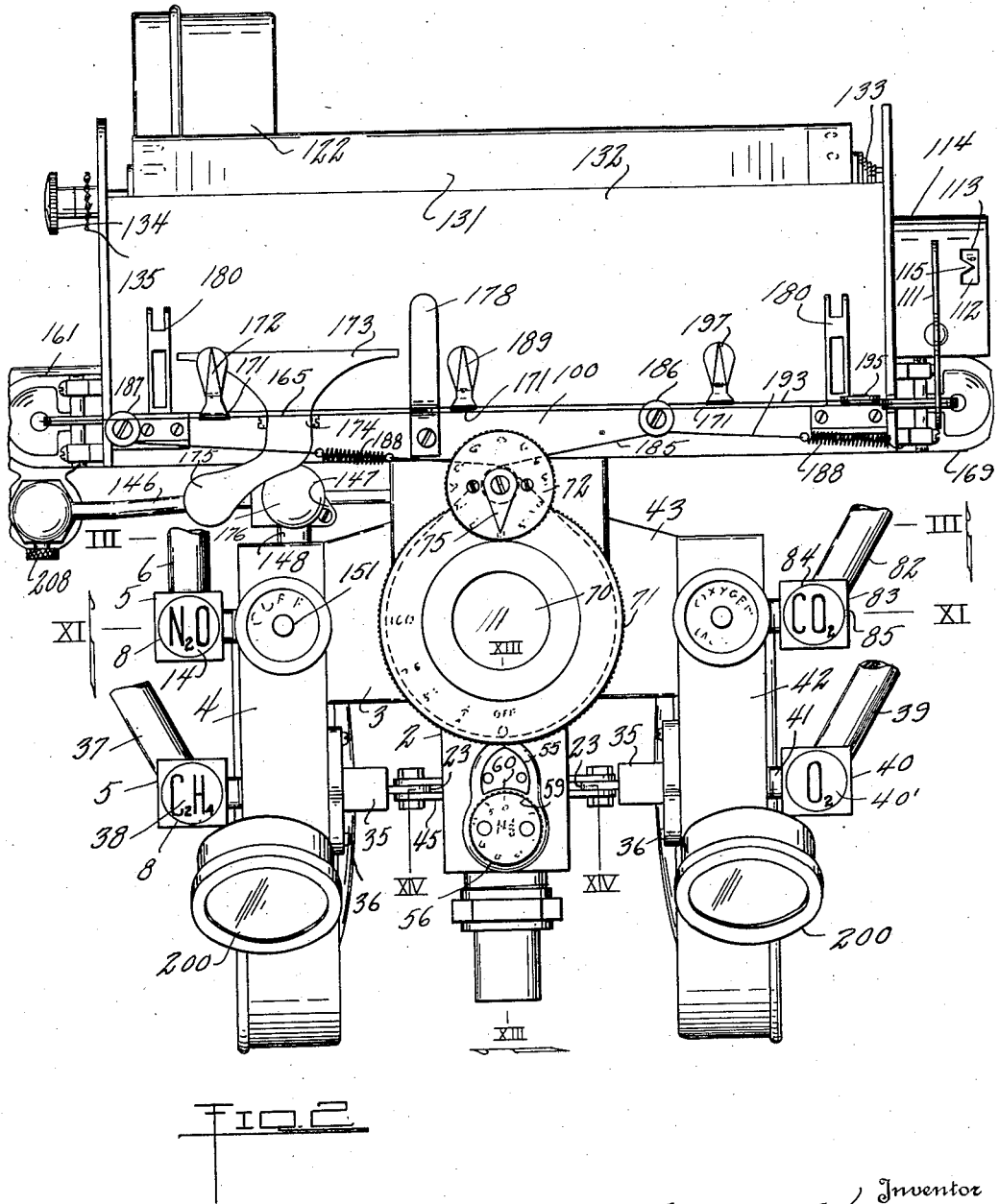

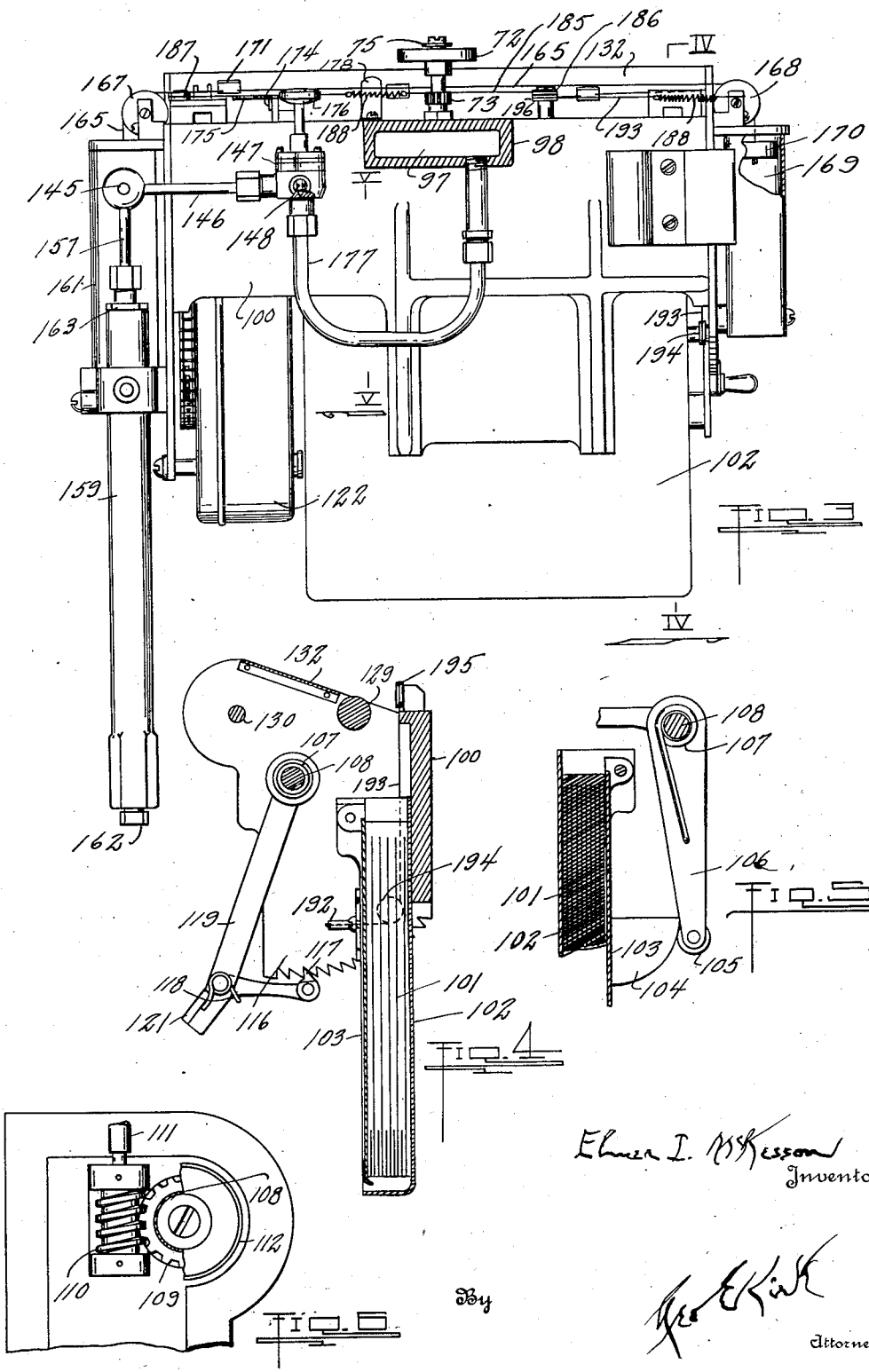

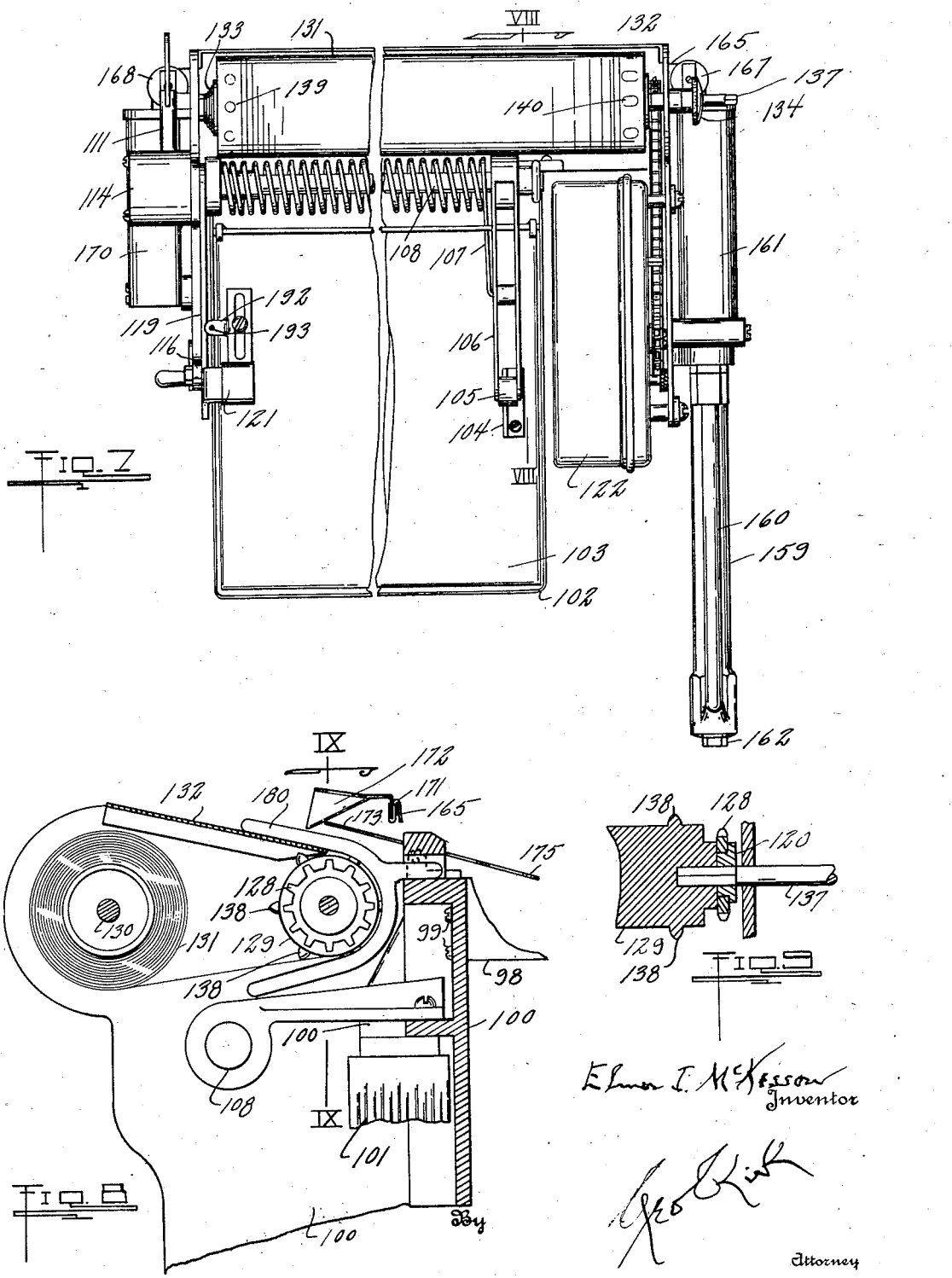

GAS ADMINISTRATION

Filed March 31, 1930  6 Sheets—Sheet 5

Inventor
Elmer I. McKesson
By
Attorney

March 31, 1936.  E. I. McKESSON  2,035,492
GAS ADMINISTRATION
Filed March 31, 1930   6 Sheets-Sheet 6
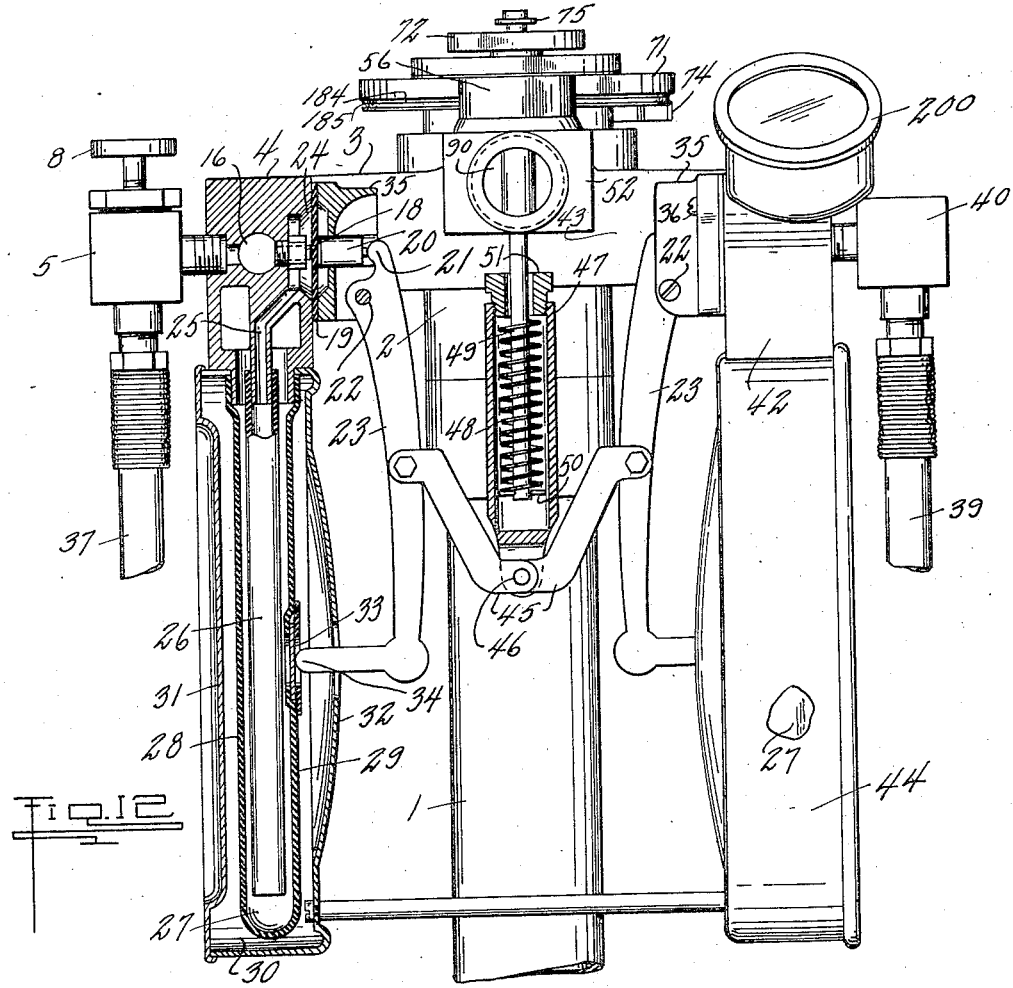
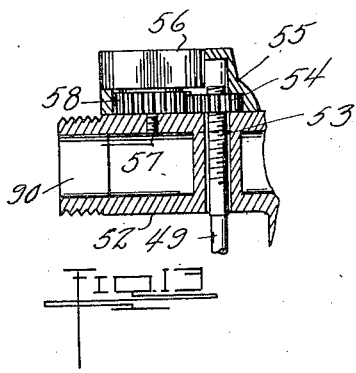
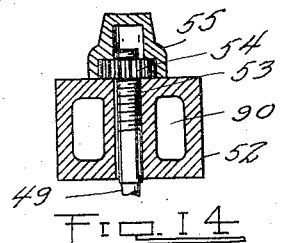

Patented Mar. 31, 1936

2,035,492

UNITED STATES PATENT OFFICE 2,035,492

GAS ADMINISTRATION

Elmer I. McKesson, Toledo, Ohio; Martha F. McKesson, executrix of said Elmer I. McKesson, deceased, assignor to Martha F. McKesson, Toledo, Ohio Application March 31, 1930, Serial No. 440,259

8 Claims. (Cl. 128—203)

This invention relates to gas administration, more particularly in connection with analgesia and anæsthesia.

This invention has utility when incorporated in connection with determining facts regarding the condition of a patient and the manner or the taking or administration of the gas or gases together with the production of a record by the patient and the operator.

Referring to the drawings:

Fig. 1 is a side elevation, with parts broken away, of apparatus for carrying out the invention herein;

Fig. 2 is a plan view of the apparatus of Fig. 1;

Fig. 3 is a section on the line III—III, Fig. 2, looking in the direction of the arrow;

Fig. 4 is a section on the line IV—IV, Fig. 3, looking in the direction of the arrow;

Fig. 5 is a partial section on the line V—V, Fig. 3, looking in the direction of the arrow;

Fig. 6 is a fragmentary view of the device from the right of Fig. 3, the cover plate being removed;

Fig. 7 is a view of the apparatus of Fig. 1, from the rear, parts being broken away;

Fig. 8 is a section on the line VIII—VIII, Fig. 7, looking in the direction of the arrow;

Fig. 9 is a section on the line IX—IX, Fig. 8, looking in the direction of the arrow;

Fig. 12 is a front view of the apparatus, parts being broken away;

Fig. 13 is a section on the line XIII—XIII, Fig. 2; and

Fig. 14 is a section on the line XIV—XIV, Fig. 2.

Major gas supplies and proportion

Figure 11:
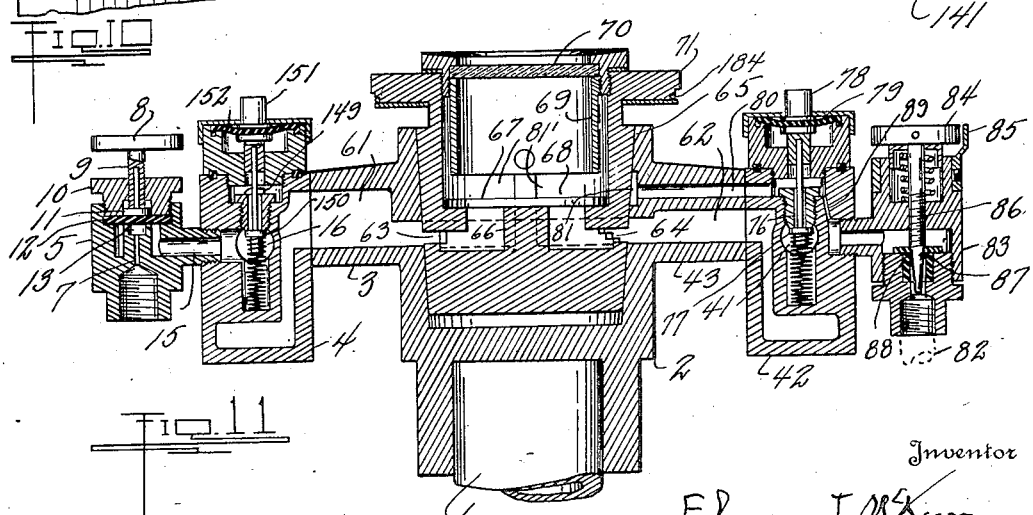
Fig. 11 is a section on the line XI—XI, Fig. 2.

A support as column 1 (Figs. 1, 11, 12) has thereon head 2 (Fig. 2), with arm 3 to block 4 carrying fitting 5 to which extends duct 6 as a supply of nitrous oxid under pressure say reduced to sixty pounds from the high pressure in the tanks. This incoming nitrous oxid enters the fitting 5 by port 7. This fitting 5 is provided with disk 8 having threaded stem 9 in bushing 10 rotatable against disk 11 to depress rubber gasket 12 into closure position at ledge 13 about the port 7.

This disk 8 is shown as carrying nitrous oxid identification 14. Upon opening this valve the nitrous oxid supply from the duct 6 will pass this packless valve to branch 15 into duct 16 of the block 4. The block 4 is assembled by screws 17 with the arm 3. As so assembled, the duct 16 has flange terminating in nozzle 18 normally held closed by rubber gasket 19, as acted upon by plunger 20 engaged by lever arm 21 of lever having fulcrum 22 and depending arm 23. The opening of the nitrous oxid supply valve 12, 13, by rotating the disk 8 permits flow of this pressure gas past the nozzle 18 into chamber 24 (Fig. 12) thence by duct 25 and tube 26 into reservoir 27 having opposing flexible diaphragm sides 28, 29. This distensible rubber bag 27 is housed in chamber 30 having shield side 31 for the diaphragm 28 and shield side 32 for the diaphragm 29. This diaphragm 29 is provided with central metallic insert or seat 33 against which engages nose 34 of the depending arm 23 of the lever 21, 23. Accordingly, as the pressure supply of gas builds up in the small capacity distensible gas bag 27, the diaphragm 29 moves out into the shield 32 and rocks the lever 23, 21, on its fulcrum 22 in thrusting the plunger 20 against the gasket 19 in closing the nozzle 18.

The fulcrum 22 is carried by member 35 assembled by screws 36 with the block 4 to locate the plunger 20 in alignment with the nozzle 18. In parallel with the nitrous oxid gas supply line 6 may be ethylene gas supply line 37 having its supply control by cut off disk 8 bearing identification notation 38 at a fitting 5 (Fig. 2).

Oxygen supply line 39 may extend to fitting 40 having identification notation 40' in communication with duct 41 in block 42 mounted by arm 43 on the head 2. This block 42 is similar to the block 4. The block 42 carries member 35 providing mounting for fulcrum 22 of lever having depending arm 23 (Fig. 12) coacting on distension of bag 27 in shield 44 similar to the shield 30. Between the levers 23 is pair of links 45 as a toggle having connecting pin 46 engaged with sleeve 47 in which is located compression spring 48 about stem 49 having pin 50 for bringing the spring 48 under compression against bushing 51.

This stem 49 (Figs. 13, 14) extends upward through arm 52 and has threaded portion 53 coacting with pinion nut 54 held against the arm 52 by block 55. Knurled disk 56 on stem 57 is fast with pinion 58 in mesh with the pinion 54. The disk 56 (Fig. 2) carries notation 59 movable as to the pointer 60 on the block 55. The adjustment of this disk 56 determines the compression of the spring 48 and accordingly equalizes the pressure of the gases say nitrous oxid in one bag and oxygen in the other bag for distension in the shields 30, 44. The flow of gas as thus permitted at the adjusted pressure is from the respective blocks 4, 42, through ducts 61, 62 (Fig. 11), to ports 63, 64, at plug proportioning valve 65, for flow upward on opposite sides of medial partition 66 to lift disk 67 and thus flow into chamber 68.

Depending skirt 69 below window 70 determines the lift of this check disk 67. About this window 70 is notation carrying flange 71 disclosing percentage of oxygen in the proportion.

For more delicate minor rotations of this proportioning plug valve than through the grasping of the marginally knurled flange 71, there is minor notation disk 72 having fixed therewith pinion 73 in mesh with gear segment 74 fixed with the flange 71. This minor scale notation carrying disk 72 (Fig. 2) is located below fixed pointer 75 and has a reading indication for the scale on the disk 72.

Oxygen gas supply independently of proportioning

In the conducting of anæsthesia or analgesia with the apparatus as herein disclosed there is available emergency oxygen independently of anæsthetizing gases which may be supplied for bringing up the patient as sinking, for inflating the lungs or as artificial respiration means. To this end in the duct 41 is port 76 (Fig. 11) normally maintained closed by valve 77. The operator by depressing push button 78 against flexible rubber diaphragm 79 may unseat this valve 77 and allow a direct flow of oxygen to duct 80 and by ports 81, 81', directly into the chamber 68 above the disk 67.

Carbon dioxid supply independently of proportioning

As an excitant for promoting respiration, carbon dioxid as an auxiliary gas may be supplied say by line 82 to fitting 83. By rotating disk 84 as to pointer 85, plunger 86 may be shifted from off position to minor volume flow rates say as indicated for 100 c. c. per minute, graduated by the clearance of taper portion 87 as to phenol condensation product seat 88, thus allowing the carbon dioxid from the line 82 to flow from the fitting 83 by passage 89 to the passage 80, and thereby reach the chamber 68 above the check disk 67.

Gas supply to the patient

From the chamber 68 above the check disk 67 the gases may flow by way of passage 90 in arm 52 and thence by flexible hose 91 to mask fitting 92 having flexible rim 93. This mask 92 (Fig. 1) is provided with adjustable relief valve 94 having scale 95 for determining holding action of its exhaust or relief and such may be adjusted down for positive holding or temporarily by depressing push button 96 there may be holding against release.

The holding of this push button 96 against release may be adopted in the instances for lung inflation by oxygen or inciting respiration by intermittently supplying the oxygen by the pressing of the push button 78 and holding this button 96 down, then releasing both upon the exhalation by the patient.

Rebreathing

Exhalation from the patient seats the disk 67 and with the adjustment of the relief valve at the mask for a degree of holding action, the exhaled gases may pass through the chamber 68 by way of the ports 81' from the passage 90 into passage 97 (Fig. 3) in arm 98. At this arm 98 there is mounting by screws 99 (Fig. 8) of block 100 from which depends gusseted distensible rubber rebreathing bag 101 housed by fixed shield portion 102 (Fig. 4) and movable lid portion 103. This lid portion 103 is provided with cam arm 104 engaged by roller 105 of depending arm 106 normally held against this cam 104 by torsion spring 107 (Fig. 5).

The configuration of the cam 104 is to approximate uniform pressure holding action for resisting distension or inflation of the bag 101 as arrested by varying the tension on the spring 107 about shaft 108. This shaft 108 carries worm wheel 109 (Fig. 6) in mesh with worm 110 which may be rotated by key 111 and the angle of friction in this speed reduction serves as a holding action. Fixed with the shaft 108 is indication disk 112 (Fig. 2) movable past window 113 in shield 114 so that pointer 115 may disclose the pressure on this rebreathing bag 101 say in millimeters of mercury.

Fixed with the frame 100 is ratchet 116 (Fig. 4) engageable by shrouded pawl 117 normally held by torsion spring 118 into engagement with ratchet 116. This pawl is mounted by depending arm 119 loosely mounted on shaft 108 carried with the block 100. Fixed with this arm 119 is abutment 121 overhanging to limit the outward or opening swing of the lid 103. Thereby there is positive limitation of the rebreathing volume or shifting toward distended position of this rebreathing bag 101.

As this resistance to filling of this rebreathing bag 101 is adjusted, it is, in operation, in order that such filling should occur before there is escape of the exhalation at the relief valve adjacent the mask. This means that the uncontaminated gases which did not go down into the lungs sufficiently to be used by the patient are conserved and there may be desirably a portion of the carbon dioxid exhalation also conserved in this rebreathing bag 101. Furthermore on inhalation the rebreathing bag collapses before the check disk 67 is lifted thereby insuring the return of the carbon dioxid as an excitant to respiration in advance of the new gases. This is an important factor in preserving the respiration cycle for the patient.

Chart

Mounted by the block 100 is clock motor 122 provided with starting and stopping switch 123, speed adjustment arm 124 (Fig. 1), driving sprocket 125 and winding shaft 126. From this sprocket 125 extends sprocket chain 127 to sprocket wheel 128 having slip frictional drive connection to bushing 120. This bushing 120 is keyed with roll 129.

Fixed with the block 100 and laterally of roll 129 is shaft 130 mounting reserve roll 131 as a continuous strip of paper to pass therefrom under the roll 129 thence upwardly and rearwardly over table 132. This roll 131 has slight tension placed thereon by spring 133 at one end. At the opposite end there extends knurled button 134 which may be engaged by the attendant and rotated for releasing the shaft 130 and removing the supply of roll stock or paper strip 131 thereon. This button 134 is convenient anchorage for chain 135 to carry key 136 to engage protruding stem 137 from the roller 129 and rotate such roller as may be desired in locating the strip 131. This roller 129 has radially extending bosses 138 at each end. The bosses at one end, say at the left, extend through and approximately fit into openings 139 in the paper strip 131 while to compensate for humidity variation in the paper the bosses 138 at the opposite end extend with freedom for movement transversely in the stock into slots 140 in the paper. There is thus by rotation of the key 136 a positive feeding of this strip 131 as to the table 132. This chart 141 (Fig. 10) from the roll 130 is provided with notations and graduations for directly recording on the time sequence conditions as transpiring.

Pulse pressure

In taking the pulse pressure, bandage 142 may be wrapped about say the biceps of a patient, with the bag 143 therein connected by duct 144 (Fig. 1) to port 145. This port 145 is connected by duct 146 with fitting 147 having communication with passage 148 in the block 4. In this block 4 from the passage 16 is port 149 normally closed by valve 150. Depression of push button 151 is effective through rubber gasket 152 to open this valve 150 (Fig. 11) and allow flow of pressure gas from the passage 16, say nitrous oxid, into the passage 148 and to fitting 147 and duct 146 into the tube or hose 144 extending to bag 143 to inflate this bandage to such degree that disk 153 as held by bandage 154 in proximity to be responsive to pulse action, say in the elbow, may not be operable. That is from this disk 153 duct 155 to head set 156 of this stethoscope may be such that audible pulse action is not heard.

This pressure gas into the fitting 145 is in communication with duct 157 extending above mercury column 158 (Fig. 1) in manometer having major portion 159 and minor communicating duct 160. This minor duct 160 terminates above the balanced region in differential chamber 161 of greater diameter than the major manometer chamber 159. Plug 162 may drain the manometer or be a relief for adjusting the level of the mercury therein.

This manometer pressure connection between the duct 157 and chamber 159 is at fitting 163. In the chamber 161 is float 164 connected by flexible cord 165 passing upward through port 166 about roller 167 at one side of the table 132 thence about roller 168 at the opposite side and downward therefrom into well 169 there to be attached to counterweight 170 (Fig. 3). This cord 165 is provided with clip 171 in which may be located ink carrying groove or fountain pen 172 in the vicinity of member 173 having fulcrum 174 and handle 175 (Fig. 2). By depressing the handle 175 the pen 172 is lifted clear of the chart 141 and this is the condition upon inflation of the bag 143 at the bandage to the extent that pulse beats are not audible. The fitting 147 (Fig. 3) is provided with rotary control disk 176 on the stem of a valve which in opening allows seepage flow of this bandage inflating gas from the passage 146 by way of passage 177 back into passage 97 in the arm 98 of the machine. As the stethoscope reveals the pulse action as effective past the bandage 142, the operator lifts the handle 175 to allow the pen 172 to rest upon the chart 141. This lowering of the pen into writing position on the chart 141 is in the vicinity or toward hold down clip 178 for the chart. The operator of the stethoscope allows the pen to travel toward the left as the pressure lowers and the float 164 consequently descends. This traveling action of the pen on the chart is permitted until the travel from the systolic position at first hearing until diastolic position when audibility ceases and the pen is lifted by depressing the handle 175. There is thus provided straight line 179 (Fig. 10) as a recording of the pulse pressure range and this location of the range on the chart is preferably one transversely of the parallel lines graduated in millimeters of mercury say 10 millimeters of mercury per line. The gas thus used seeps back into the machine and the seepage valve 176 may be closed. Inasmuch as the chart 141 is progressing by clockwork and the operator has noted the time for the operation, it is automatically recorded the time in which this pulse pressure condition was obtained and there may be repetition in this straight line recording of the heart action as frequently as the attendant may desire with condition thus differently recorded at each reading on the time schedule.

Figure 10:
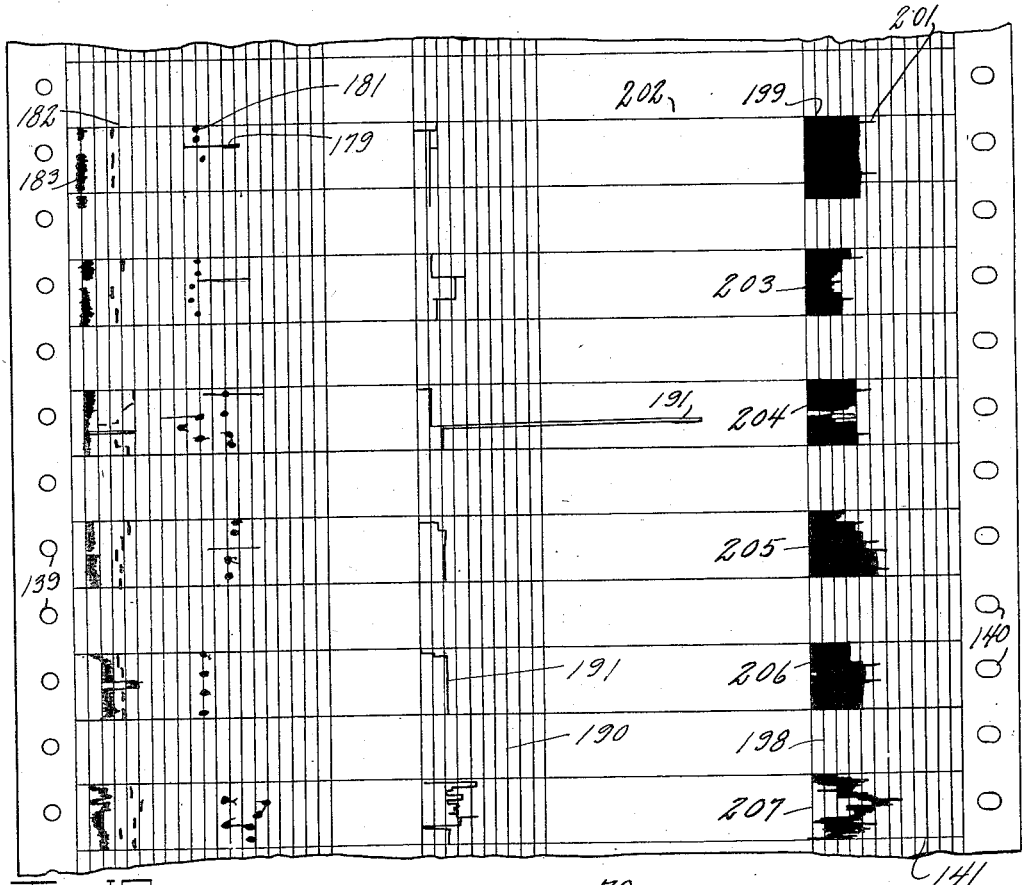
Fig. 10 is a chart having fragmentary disclosures of various significant features of record.

In this travel of the chart over the table 132, the chart is loosely held in such operative position as to the table by loose side shoes 180 lying over the bosses 138 (Figs. 2, 8). There is accordingly during the operation at all times consequently available the pressure gas which gas is not wasted and which inflation may be readily repeated with the seepage for depression and the recording readily occur. To supplement this check on pulse pressure condition, the attendant may note from stop watch source the pulse rate 181 and additionally respiration rate 182 (Fig. 10). Respiration pressure is automatically determined by leaving this valve 176 open so that the adjusted pressure under which the machine is operating is transmitted through the line 177 to the manometer and thus the pen 172 may in the intervals when the pulse rate pressure is not being taken, operate on the chart in recording writings 183.

These notations in millimeters of mercury apply directly for the pressure and pulse pressure while the same notations may refer to the pulse rate and respiration rate.

Proportioning recording

About the flange 71 is groove 184 for cord 185 (Figs. 2, 11, 12) extending about roller 186 and thence to the left about roller 187 and back past helical spring take up means 188 and the stem mounting the disk 72 to this guide groove 184. This cord 185 also carries clip 171 for pen 189 operable on chart region 190 graduated in percent of the oxygen in accordance with the scale on the flange 71 of disk 72. There is thus a direct recording by this pen 189 at writing 191 of oxygen percentage operation of the machine (Fig. 10).

Rebreathing recording

The shield 103 is provided with bracket 192 to which extends cord 193 over roller 194 and thence upward over guide roller 195 thence about roller 196 below the roller 186 and back to tension take-up device 188 as a terminus. This cord 193 is provided with clip 171 carrying pen 197 operable on chart region 198 (Fig. 10) having scale showing rebreathing in cubic centimeters, herein shown as 100 c. c. per line as the capacity changes at the notches 16 for the distension of the rebreathing bag 101.

At each inhalation, the pen 197 descends to zero, or with the pen adjusted for the condition at which the rebreathing occurs in full deflation of the bag, and upon exhalation moves outward in making writing 199 as the automatic recorded chart condition at the time and during the breathing of the patient. Gages 200 at the machine may disclose to the attendant that reduced pressure, say 60 pounds, is being maintained in the sources of supply. The respective pens 172, 189, 197, should be maintained in ink flowing condition and during the operation of the clockwork, with the transverse lines say five minute intervals, the conditions met in the patient are graphically recorded as occurring.

Tidal respiration

Besides the occasional taking of the pulse pressure there may be checking of the patient's tidal volume of respiration by releasing the pawl 117 and holding the exhaust valve at the mask so that there is the full throw of exhalation trapped in the rebreathing bag 101. This causes the pen 197 to write rebreathing chart line 201.

The conditions as desirably met in practice may be identified as in region 202 in the chart (Fig. 10).

When excess of oxygen causes a reduction in volume of respiration and reduces the effect of the nitrous oxid, there is met the condition as shown at region 203 (Fig. 10).

When the respiration is stopped and pure oxygen is forced into the lungs under 35 millimeters of mercury pressure twice to start breathing again, there is the chart condition 204 which also discloses the slowing up of the pulse rate and recovery of the pulse rate and respiration after the resuscitation.

Chart condition 205 shows how small respirations may be increased in depth by rebreathing progressively more and more until adequate volume of respiration is obtained.

Chart condition 206 (Fig. 10) shows gases administered at ten to fifteen millimeters of pressure with rebreathing of 300 to 400 c. c. while at one time forty millimeters of mercury pressure was used. This is a condition which may be employed in extraction of teeth.

Chart region 207 (Fig. 10) shows poor technical handling of anæsthesia with irregular breathing and variable pulse and respiration rates partly as a result of irregular mixtures or percentages of the oxygen in the mixture.

When the cuff or bandage 142 and duct 144 are disconnected, plug 208 closes the manometer so that the pen 172 may be effective for writings 183 on the chart.

The operator who is in control position at the machine for the various valves and controls, in looking down thereon, has before him at the chart a station which is a clearing house for the recording instruments as disclosing means in the operation of the anæsthesia apparatus of this disclosure.

What is claimed and it is desired to secure by Letters Patent is:

1. Apparatus for administering gas to a patient comprising duct means to be influenced by pulse pressure, pressure gas supply means thereto, a control for delivering said supply in excess of pulse pressure, a gas administering duct from the duct means, and a seepage control for lowering pressure in the duct means in pulse pressure means and delivering such into the said gas administering duct.

2. Apparatus for producing the particular result of anæsthesia by means of known gas adapted to be repeatedly diluted by respiration during administration to a patient, said apparatus comprising means for supplying a volume of known gas adapted for inhalation by the patient, means for proportioning said supply relatively to exhaled gas, means for delivering said supply at a pressure above atmospheric pressure, means for regulating said above-atmospheric pressure of said gas at pressure points in a range adapted to be influenced by exhalation independently of and notwithstanding discontinuance of said supply during inhalation, manually adjustable pressure means adapted to maintain said exhaled gas at a pressure above that of the known gas supply for the full delivery volume thereof as an inhalation diluent in advance of known gas to the patient, and means for disclosing exhaled gas volumes of succeeding respirations.

3. Anæsthetizing apparatus, a plurality of ducts leading thereto adapted for gas transmission from independent sources of gas supply under pressure, there being passages in said apparatus in communication with said ducts, a mixing valve to which a plurality of said passages extend from the ducts and adapted to supply gas thereto, a delivery duct to which said valve is adapted to deliver a predetermined mixture of gases, means providing a passageway from one of said passages by-passing said mixing valve to said delivery duct, gas flow control means in said passageway, one of said passages extending direct from one of said ducts to said way between the delivery duct and control means, and a valve in said latter passage.

4. Anæsthetizing apparatus comprising a machine, a pressure gas supply therefor, valve means for controlling gas flow in said machine, a manometer, means mounting the manometer with the machine for controllable connection with said supply, said manometer including a float, a manometer operation disclosing means and a flexible connection between the float and disclosing means, and a flexible wall chamber providing means adapted to be assembled with a patient to be affected by pulse condition of the patient, said latter means being provided with duct connections to be charged by said gas supply for operating said manometer.

5. Anæsthetizing apparatus embodying a machine provided with independent pressure gas supply ducts thereto, valve means for controlling the flow of said gases in said machine, a delivery duct for the mixed gases from said valve means, a branch duct from one of said supply ducts, a manometer in communication therewith, an inflatable cuff adapted to be positioned on a patient, and a duct from said branch to said cuff.

6. Anæsthetizing apparatus embodying a machine provided with independent pressure gas supply ducts thereto, valve means for controlling the flow of said gases in said machine, a delivery duct for the mixed gases from said valve means, a branch duct from one of said supply ducts, a manometer in communication therewith, an inflatable cuff adapted to be positioned on a patient, a valved duct from said branch to said cuff, and spill control means from the cuff back to the delivery duct.

7. Anæsthetizing apparatus embodying a machine providing with independent pressure gas supply ducts thereto, valve means for controlling the flow of said gases in said machine, a delivery duct for the mixed gases from said valve means, a branch duct from one of said supply ducts, a manometer in communication therewith, a pressure cuff adapted to be positioned on a patient, said manometer including a float, and pulse condition-disclosing means connected to be operated by said float.

8. In anæsthesia apparatus, a plurality of sources of gas supply under pressure, ducts for said gases, a mixing valve, a delivery duct from said mixing valve, there being a passageway from one of said ducts, valve means in said passageway for controlling flow of gas therethrough, a manometer having connection with said passageway, a branch duct from said manometer, an inflatable cuff to which said branch duct means extend, a valve for spilling gas from the cuff, and disclosing mechanism operable by said manometer for pressure condition at the cuff.

ELMER I. McKESSON.